US005657705A

United States Patent [19]

Martin et al.

[11] Patent Number: 5,657,705

[45] Date of Patent: Aug. 19, 1997

[54] HEAT TREATMENT FURNACE FOR WASTE AND ASSOCIATED PROCESS

[75] Inventors: Gerard Martin; Eric Marty, both of Rueil-Malmaison; Ari Minkkinen, Saint-Nom-La Breteche, all of France

[73] Assignee: Institut Francais du Petrole, Rueil Malmaison, France

[21] Appl. No.: 489,119

[22] Filed: Jun. 9, 1995

[30] Foreign Application Priority Data

Jun. 10, 1994 [FR] France .................................. 94 07220

[51] Int. Cl.⁶ ...................................................... A47J 36/00

[52] U.S. Cl. ............................ 110/246; 110/229; 110/346

[58] Field of Search .................................... 110/246, 229, 110/346

[56] References Cited

U.S. PATENT DOCUMENTS

| | | | |
|---|---|---|---|
| 4,301,750 | 11/1981 | Rito et al. . | |
| 4,870,911 | 10/1989 | Chang et al. | 110/246 |
| 5,311,830 | 5/1994 | Kiss | 110/229 |
| 5,374,403 | 12/1994 | Chang | 110/346 |
| 5,377,603 | 1/1995 | Reese et al. | 110/346 |
| 5,393,501 | 2/1995 | Clawson et al. | 110/246 |
| 5,435,258 | 7/1995 | Piette | 110/246 |
| 5,455,005 | 10/1995 | Clawson et al. | 110/246 |
| 5,553,554 | 9/1996 | Urich, Jr. | 110/246 |

FOREIGN PATENT DOCUMENTS

| | | |
|---|---|---|
| 0022214 | 1/1981 | European Pat. Off. . |
| 2166516 | 8/1973 | France . |
| 3741623 | 6/1989 | Germany . |
| 2212797 | 8/1989 | United Kingdom . |

*Primary Examiner*—John T. Kwon
*Attorney, Agent, or Firm*—Antonelli, Terry, Stout & Kraus, LLP

[57] ABSTRACT

A furnace for effecting pyrolysis of waste material includes an essentially cylindrical cavity for effecting pyrolysis of the waste material rotating around its lengthwise axis, a combustion chamber located around the cavity and injectors for introducing fuel and comburant or oxidizing agent into said chamber. The injectors for introducing fuel and comburant are oriented tangentially to a wall of the combustion chamber so that flame or flames created by combustion of the fuel developed in the swirling fashion around the cavity containing the waste material. Also, the injectors are arranged to effect staged combustion within the combustion chamber.

11 Claims, 1 Drawing Sheet

HEAT TREATMENT FURNACE FOR WASTE AND ASSOCIATED PROCESS

The present invention relates to heat treatment, more specifically pyrolysis, of solids, particularly industrial and/or household waste.

Heat treatment of waste, particularly pyrolysis thereof, is a technology in increasing use since it offers a number of advantages over other means such as dumping, compacting, and so-called wet treatments, i.e. those involving at least one step in which the solids are washed.

However, heat treatment sometimes has drawbacks:

It requires a considerable energy input since the solids must be raised to temperatures that may exceed 1000° C., leading to high operating costs, The sometimes highly heterogenous nature of the waste calls for operating flexibility that is often incompatible with the thermal inertia of the facilities, and means for monitoring chlorine flows, Discharges of pollutants such as sulfur oxides created by pyrolysis must be controlled then inhibited since these discharges are of course harmful to the environment. Increasingly strict regulations render the problem of pollutant discharge very acute.

A number of technologies have already been proposed for solving these problems individually.

Thus, French Patent Application FR 2,668,774, filed in the name of the applicant, describes a facility comprising a rotating pyrolysis furnace heated externally and in particular having a specific means of trapping the pollutants produced by pyrolysis.

French Patent Application EN.94/06660 filed in the name of the applicant discloses a rotating pyrolysis furnace comprising heating means located inside the pyrolysis furnace itself to decrease energy consumption and thermal inertia.

The present invention represents an improvement in this type of facility since it provides in particular:

- the possibility of using the pyrolysis gases without specific treatment, namely with their tars and particles if these remain in limited quantities, to heat the rotating cylinder indirectly;
- a simple combustion device that eliminates fouling problems;
- a combustion device that can reduce NOx emissions by staging the injection of fuel and/or comburant;
- the possibility of completing, by dry treatment, dechlorination of the pyrolysis gases already commenced in the rotating cylinder.

The present invention allows in particular the problem of fouling in the pyrolysis gas evacuation lines to be solved.

Monitoring and controlling the pressures in the system is also advantageously dealt with in the invention.

The objectives listed above are achieved according to the invention which relates to a furnace designed for heat treatment of waste, comprising an essentially cylindrical cavity for the waste to be treated, rotating around its lengthwise axis, a combustion chamber located around said cavity, and means designed for introducing the fuel and the comburant into said chamber.

According to the invention, the fuel and comburant introduction means are oriented tangentially to the wall of said combustion chamber so that the flame or flames they create develop(s) in swirling fashion around said cavity containing the waste.

Advantageously, the fuel and/or comburant introduction means are spaced lengthwise along the cavity to produce staged combustion in said combustion chamber.

In particular, the furnace also comprises an outlet for the pyrolysis gases, associated with a line designed to bring said pyrolysis gases to the fuel introduction means in said combustion chamber.

According to the invention, the pyrolysis gas recycling line comprises an absorbent-injection means and a means of separating the gases from the solids circulating in said line.

In addition, the rotating furnace can comprise means designed to keep the interior of the combustion chamber at a pressure essentially equal to atmospheric pressure.

Without departing from the framework of the invention, the pressure-maintenance means comprise in particular a means for extracting combustion fumes and a flowrate control valve controlled by a pressure sensor located inside said combustion chamber.

The invention also relates to a process for heat treatment of waste comprising pyrolysis of the waste in an essentially cylindrical cavity which rotates around its lengthwise axis and heating of the cavity by means located in a combustion chamber surrounding said cavity 1, injection of fuel and comburant into the combustion chamber being accomplished tangentially to the inside wall of said combustion chamber.

Preferably, staged combustion is effected in said combustion chamber.

Advantageously, the process can also comprise a stage in which the pyrolysis gases leaving the cavity are dechlorinated.

Other details, characteristics, and advantages linked to the present invention will emerge from reading the description hereinbelow provided for illustration and not limitation, with reference to the attached figures wherein.

Figure 1:
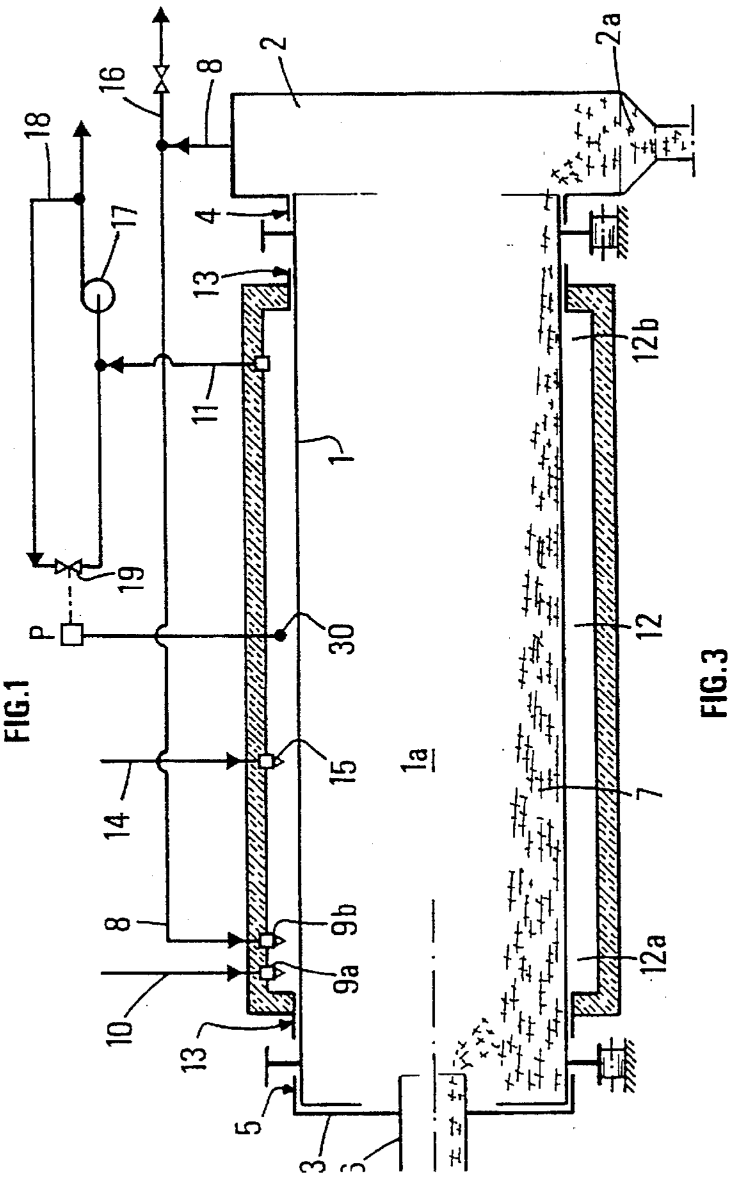
FIG. 1 shows a rotating furnace according to one embodiment of the invention schematically in lengthwise section.

An illustration of the device according to the invention is thus provided in FIG. 1. The furnace has an elongate cylindrical rotating part 1 connected at the end to fixed parts 2 and 3 by means of seals 4 and 5. Rotating part 1 is always either horizontal or slightly inclined according to the requirements of flow and residence time of the solids in the system.

The waste is brought by a line 6 attached to fixed element 3 at the furnace head. At the outlet from line 6, the waste falls into rotating part 1, where it constitutes a bed 7, and is heated then pyrolized as it progresses through the furnace to fixed part 2.

Fixed part 2 has a zone *2a* for tapping off the solid phase and a line 8 held over its entire length at a temperature close to that of the waste leaving rotating part 1 and intended for evacuation of the pyrolysis gases.

Heating of rotating part 1 is ensured by combustion of the pyrolysis gases with the aid of means *9a* and *9b* attached to a fixed chamber 12 which is essentially cylindrical and completely envelops a major part of rotating cylinder 1.

Means *9a* and *9b* are essentially injection means of injecting and controlling the flows of air and fuel, the air being supplied via a line 10 and the fuel being supplied via line 8, which allow a flame or flames enveloping rotating part 1 to be generated.

The injection means are preferably located opposite the first part of the rotating cylinder where the waste is still cold and wet and where energy requirements are accordingly highest.

Figure 2:
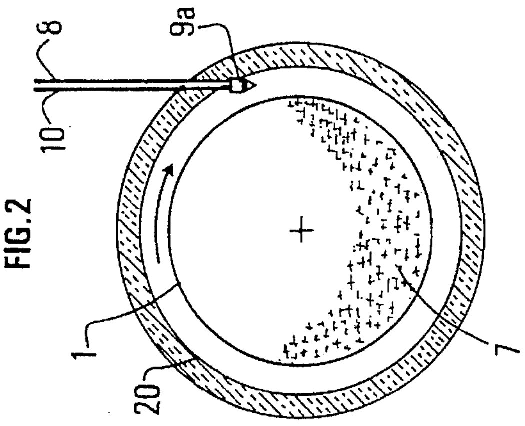
FIG. 2 is a simplified cross section of a furnace according to the invention.

The positioning of injection means will be better understood with the aid of FIG. 2 which shows that they are installed such as to ensure substantially tangential introduction of the fuel and comburant, which generates a flame that develops near wall 20 of chamber 12, which is preferably composed of refractory, insulating materials.

The fumes produced by combustion means 9 progress from end 12*a* to end 12*b* in an essentially swirling movement which completely envelops rotating part 1. They leave chamber 12 via a line 11.

The tightness of chamber 12 relative to the exterior is provided by rotating seals or equivalent devices 13.

According to a particular operating mode of the invention, the combustion can be staged by supplying only part of the air necessary for combustion via line 10 and supplying the remainder via an additional line 14. This staging strategy reduces emission of NOx when the fuel contains nitrogen compounds.

Thus, combustion staging allows the flame to develop as the mixture forms. This characteristic avoids in particular the self-ignition problems which arise when a mixture of air and combustion is created upstream of the burners.

Staging of the combustion also allows the heat flows to be modified along the rotating cylinder. Staging can also relate to both the fuel and the air, although staging of the fuel is in principle less desirable since it assumes placement of flow control devices, which increase the risks of fouling and clogging of the pipes carrying the pyrolysis gases.

Preferably, the furnace according to the invention can allow treatment of waste at temperatures between 150° and 900° C., with a preference for the 400°–600° C. range.

Advantageously, the pyrolysis gases are burned without treatment. They can thus carry hydrocarbon or nonhydrocarbon particles which generate ash into chamber 12. For this purpose, the lower part of chamber 12 can comprise classical ash collection and discharge devices such as scrapers (which are not shown in FIG. 1).

The means for introducing air and fuel 9*a*, 9*b*, and 15 may have constrictions (venturis) designed to operate with dusty gases to that the initial fluid speeds are sufficiently high for the flow of fumes in chamber 12 to retain its swirling nature up to outlet 11. Typically, the initial air and pyrolysis gas speeds are between 10 and 250 m/s, preferably between 50 and 100 m/s. The air and pyrolysis gas speeds are not necessarily the same. The restrictions in means 9*a*, 9*b*, and 15 also allow the flowrate of pyrolysis gas coming from the rotating cylinder to be regulated, thus ensuring more-stable combustion.

When the heating requirements of the cylinder are substantially less than the energy contained in the pyrolysis gases, some of the gases coming from the circuit can then be evacuated to the outside by a line 16. In the reverse case, namely when the pyrolysis gases are not sufficiently energetic to meet the requirements of the furnace, it is possible for example to dope said pyrolysis gases with an auxiliary fuel.

To function optimally from the energy standpoint, it is necessary in particular to avoid air inflows into combustion chamber 12 by connections 13, which connections, for mechanical reasons, are not always totally fluidtight. Hence it is important for the pressure in said chamber 12 to be maintained at all times at atmospheric pressure, which can be done as indicated in FIG. 1 by controlled fume extraction accomplished for example with the aid of an extractor 17 associated with a recycling loop whose flowrate is controlled by a valve 19 controlled by the pressure information obtained by a sensor 30 located inside chamber 12.

Figure 3:
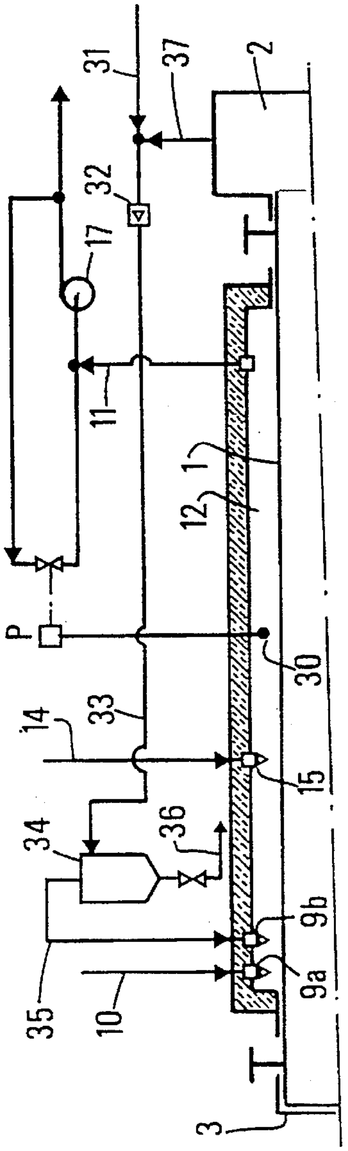
FIG. 3 shows schematically, in lengthwise section, a rotating furnace according to another embodiment of the invention.

Another embodiment of the furnace according to the invention is shown in FIG. 3, where a pyrolysis gas dechlorination stage has been added after the gas leaves the furnace. Line 8 of the furnace shown in FIG. 1 is replaced by a line which, as far as possible, is smooth to avoid clogging by deposits of solid matter or tar. Said line is preferably held at a temperature close to that of the gases leaving fixed part 2. It has an absorbent-injection device 31, preferably associated with a means 32 such as a venturi, which facilitates mixing of the absorbent with the pyrolysis gases. The dechlorination process develops along the path of the gases in a line 33. The mixture then preferably enters a gas-solid separator 34 which can be for example a cyclone or possibly a set of cyclones disposed in series or in parallel. The pyrolysis gases, essentially ridded of their particles, are then sent to combustion means 9 via a line 35, while the solids collected are evacuated via another line 36. The absorbent, partially used, can advantageously be sent into rotating enclosure 1, where it can once again participate in the pyrolysis gas dechlorination process.

Of course, minor additions and/or modifications may be made by the individual skilled in the art to the furnace and to the process described without departing from the framework of the present invention.

We claim:

1. A furnace for effecting pyrolysis of waste material comprising an essentially cylindrical cavity for the waste material subjected to pyrolysis, rotating around its lengthwise axis, a combustion chamber located around said cavity, and injection means for introducing fuel and comburant separately into said combustion chamber, said injection means comprising separate injectors for the fuel and for the comburant oriented tangentially to a wall of said combustion chamber so that flame or flames created by combustion of the fuel develop in swirling fashion around said cavity containing the waste material, an injector for introducing fuel and an injector for introducing comburant being different and spaced lengthwise along the cavity within the combustion chamber to produce stage combustion in said combustion chamber.

2. A furnace according to claim 1, wherein said injection means comprises a fuel injector and a comburant injector arranged adjacent to an end of the cavity into which waste material is initially introduced and another comburant injector arranged further along the lengthwise axis of the cavity within said combustion chamber to produce said staged combustion in said combustion chamber.

3. A furnace according to claim 1, wherein said furnace also comprises a pyrolysis gas outlet connected with a conduit adapted to transport at least a part of said pyrolysis gas to an injector for introducing fuel into said combustion chamber.

4. A furnace according to claim 3, wherein the conduit for transporting pyrolysis gases is also connected to means for injecting absorbent into said conduit to effect dechlorination of said pyrolysis gases and means for effecting separation between gases and particulate solids circulating in said conduit before introduction of the pyrolysis gases into said fuel injector.

5. A furnace according to claim 4, wherein the absorption injection means cooperate with flow control means which have non constant cross sections in order to increase the flowrate of gases passing therethrough and for increasing the intensity of a gas mix produced therein.

6. A furnace according to claim 1, wherein the furnace also comprises means for maintaining a pressure essentially equal to atmospheric pressure within said combustion chamber.

7. A furnace according to claim 6, wherein said pressure maintaining means comprises means for removing combustion gases from the combustion chamber and a flow control valve controlled by a pressure sensor located in said combustion chamber.

8. A furnace according to claim 1, wherein said rotating cavity is operatively associated with a first fixed means through which the waste is introduced into the cavity and with a second fixed means into which the waste is discharged from the cavity.

9. A furnace according to claim 2, wherein the conduit for transporting pyrolysis gases is connected to a fixed end of said furnace, said fixed end receiving waste material from said rotating cavity.

10. A pyrolysis process for treating waste material which comprises effecting pyrolysis of the waste material in an essentially cylindrical cavity which rotates about its lengthwise axis, heating the cavity by locating the cavity in a combustion chamber surrounding said cavity and introducing fuel and comburant into the combustion chamber tangentially to an inner wall of said combustion chamber so that flame or flames created by combustion of the fuel develop in a swirling fashion around said cavity, said fuel and comburant being introduced into the combustion chamber in such a manner that a staged combustion is effected in the combustion chamber along the length of the cavity.

11. A process according to claim 10, wherein said process further comprises a stage outside of said cavity wherein pyrolysis gases discharged from the cavity are dechlorinated.

* * * * *